Jan. 27, 1953　　　R. G. WEYANT　　　2,626,642
PLYWOOD PRESS
Filed Aug. 13, 1948　　　　　　　　　　　　2 SHEETS—SHEET 1
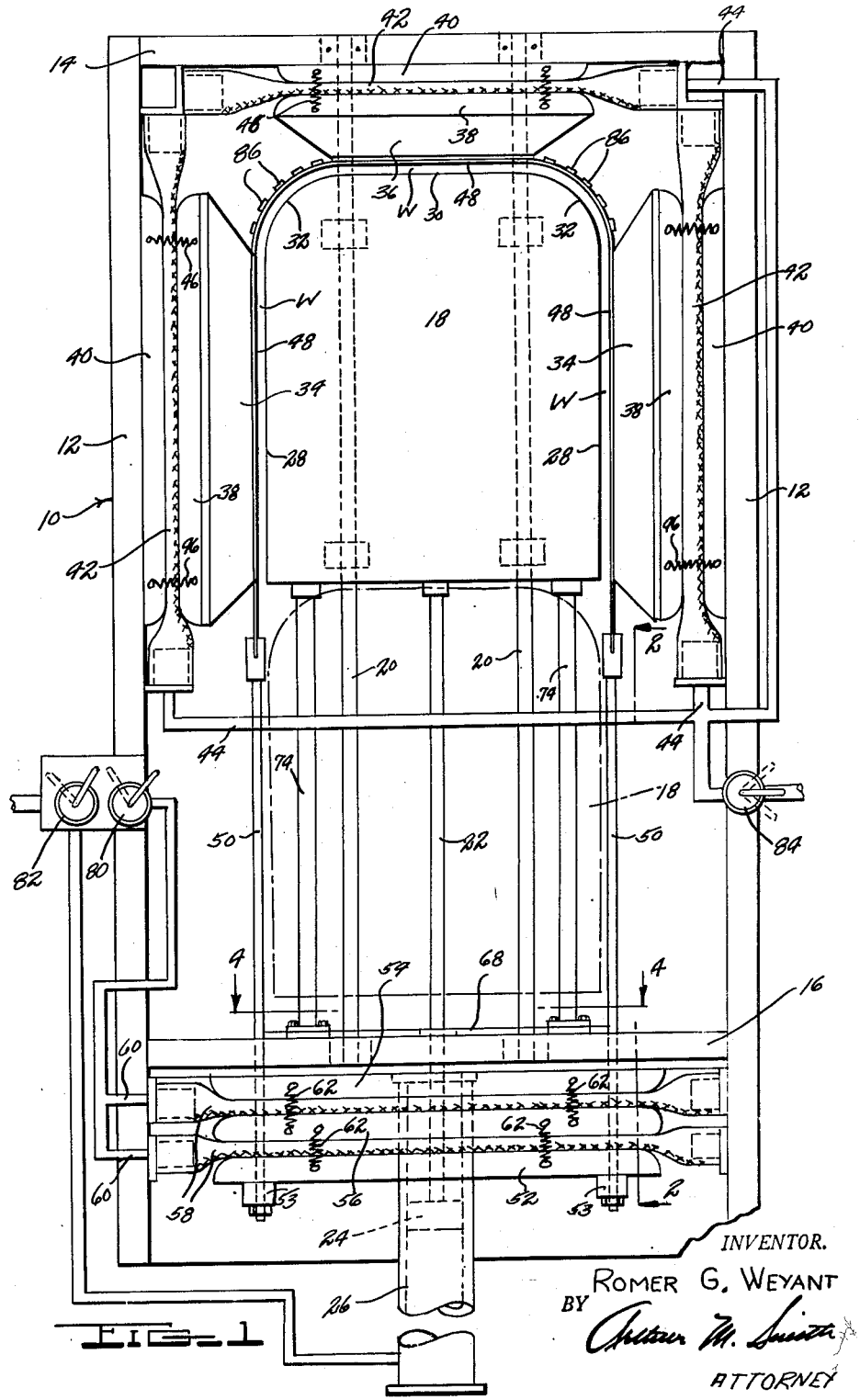
INVENTOR.
ROMER G. WEYANT
BY
ATTORNEY

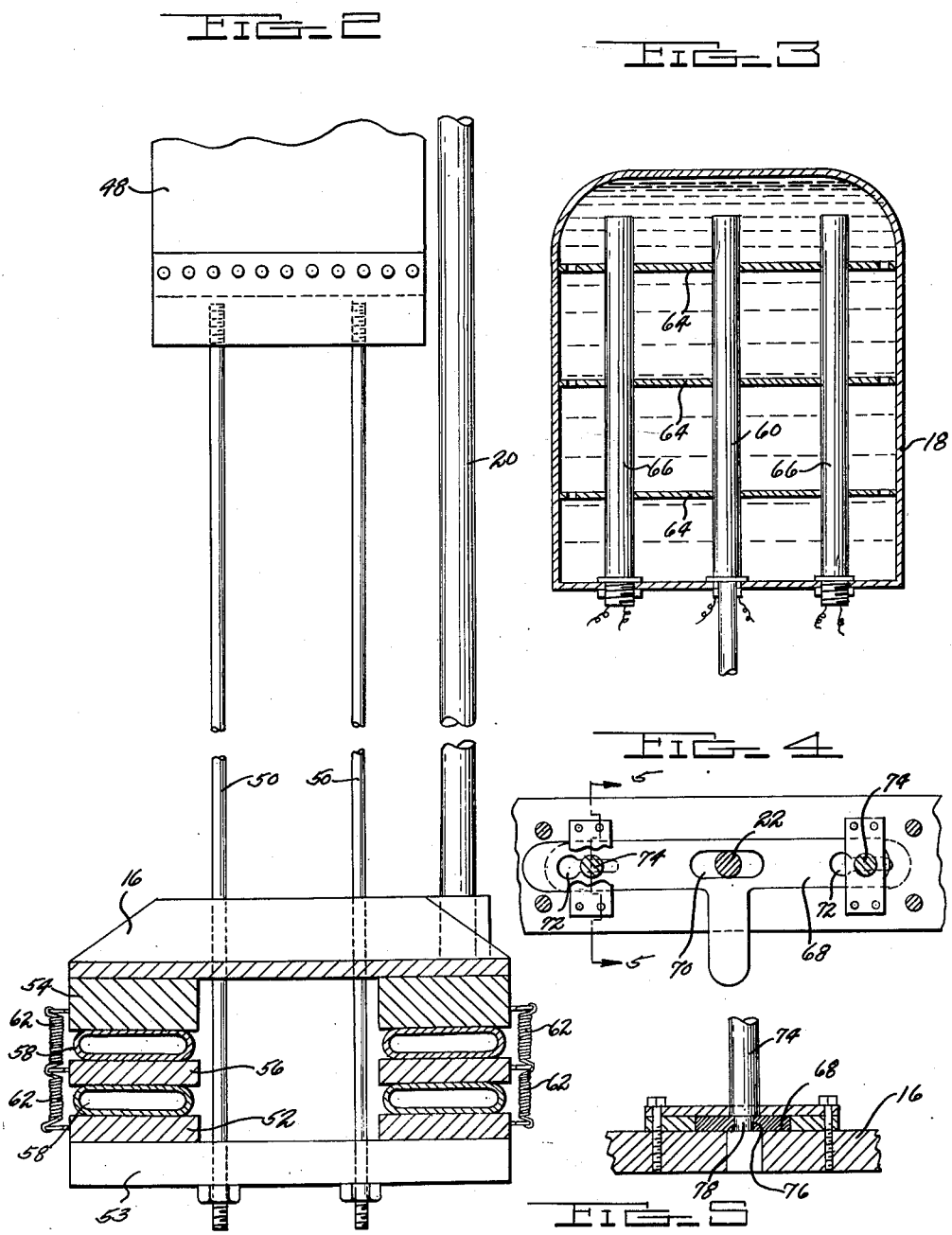

Patented Jan. 27, 1953

2,626,642

UNITED STATES PATENT OFFICE 2,626,642

PLYWOOD PRESS

Romer G. Weyant, Goshen, Ind.

Application August 13, 1948, Serial No. 44,122

1 Claim. (Cl. 144—256)

This invention relates to a press and more particularly to a press for forming and bonding a plurality of thin sheets of material into a laminated sheet having curved portions.

Prior to the present invention, presses did not provide the uniform pressure required on uncured plywood material at points where the material was to be curved.

It is an object of the present invention to provide a press having a movable die member surrounded by a pressure band in addition to pressure producing members cooperating with the band and the die member to apply a uniform pressure on the layers of uncured plywood material.

Another object of the invention is to wrap the uncured layers around a heated mandrel and draw the material around curved portions of the mandrel after which the material is positioned between heated pressure members.

A further object of the invention is to control the temperature of the heating elements so that the proper degree of heat to cure the bond between the plies may be applied at all times during the curing cycle.

Other objects and advantages of the invention will more fully appear from the following description taken in connection with the accompanying drawings in which:

Fig. 1 is a front elevational view of the press;

Fig. 2 is a fragmentary sectional view taken on line 2—2 of Fig. 1;

Fig. 3 is a sectional view through the mandrel;

Fig. 4 is a fragmentary view showing a locking mechanism for the movable mandrel; and Fig. 5 is an enlarged sectional view taken on line 5—5 of Fig. 4.

Referring to the drawings, I have shown a frame 10 having vertically extending side members 12, an upper header 14, and a base member 16. These members are secured together, preferably by welding, forming a rigid structure.

I have illustrated the invention as applied to a press for forming a plywood panel of substantially U shape form, but it is to be understood that various shapes may be formed by the selection and arrangement of pressure members and mandrels adapted to conform to the desired shape of a finished work piece.

A mandrel 18 is movably mounted on guides 20 for vertical movement between the frame members. A piston rod 22, secured to the lower surface of the mandrel 18, carries a piston 24 which cooperates with a cylinder 26 for moving the mandrel upwardly and downwardly by a fluid pressure.

The mandrel is shown having its outer perimeter formed with two vertically extending walls 28 and a horizontally extending wall 30 connected to the walls 28 by curved portions 32. Pressure plates 34 are provided between the walls 28 and the side members 12 and a pressure plate 36 is provided between the header 14 and the wall 30 of the mandrel 18. These pressure plates 34 and 36 are preferably heated by electrical resistance strip heaters. The pressure plates 34 and 36 are carried by backing members 38, which may be of wood. Oppositely disposed to the backing members 38 and spaced therefrom are plates 40 carried by the side members 12 of the frame 10. In the space between the backing members 38 and the plates 40, I have provided an expansible member 42 which is preferably a collapsible hose section, such as fire hose. One end of each hose is closed and its opposite end is provided with a connection 44 leading to a source of fluid pressure, not shown. Normally the hoses are collapsed by tension springs 46 drawing the pressure plates 38 toward the plates 40. When a fluid pressure is supplied to the inside of the hose the expansion thereof causes the pressure plates 34 to be moved inwardly toward the edges of the mandrel 18.

A U shaped band 48, preferably of flexible steel surrounds the upper and vertical side faces of the mandrel 18. The band 48 is larger than the mandrel 18 so that in its normal position there is a space W between the respective adjacent faces for the reception of the work to be formed in the press.

The opposite ends of the band are provided with draw rods 50 which project through the base member 16. At the lower end of the rods 50 and spaced from the under surface of the base member 16 is a plate 52 supported on cross bars 53. The plate 52 is movable relative to a fixed plate 54 carried by the base member 16. An intermediate plate 56 is spaced from both plates 52 and 54 and expansible members 58 are arranged in the spaces. These members 58 are similar to the hoses 42 and are adapted to urge the plates 52 and 56 away from the fixed plate 54 when fluid pressure is applied to the interior of the tube through the pressure inlet connections 60. Tension springs 62 are adapted to draw the plates 52 and 56 toward the plate 54 to collapse the hose when the fluid pressure is released.

As shown in Fig. 3 the mandrel 18 is hollow and is adapted to receive a quantity of fluid such as oil. Partitions 64 are arranged within the mandrel for strength in a light weight structure such as formed from sheet metal. Immersion type electrical heaters 66 are arranged within the body of oil and connected to a source of electrical energy having a suitable control such as a thermostatic switch, not shown, for regulating the flow in accordance with the temperature of the unit.

Secured to the upper surface of the base member 16 is a slide plate 68 having a guide slot 70 fitting the rod 22 and end T slots 72 fitting lock rods 74 depending from the bottom of the mandrel 18. The lower ends of the rods 74 are provided with a shoulder 76 and a reduced portion 78. The shoulder is adapted to rest on the outer surface of the plate 68 when the plate is in the locked position, as shown in Figs. 4 and 5, with the narrow portion of the T slot surrounding the reduced portion 78. When the plate is moved to the dotted position, shown in Fig. 4 the larger portion of the T slot permits the rod to pass through the plate thereby permitting the mandrel to be lowered away from pressure position.

This locking means permits the parts to be moved to pressure position after which the lock can be applied to mechanically retain the applied pressures without depending upon the fluid pressure to retain the parts in pressure exerting position.

A fluid pressure control valve 80 is provided for controlling the pressure plates 52, 54 and 56 which draw the band 48 around the mandrel 18 and a control valve 82 regulates the flow of pressure to the cylinder 26 for causing movement of the mandrel 18. A control valve 84 regulates the fluid pressure to the pressure plates 34 and 36 for controlling the pressure on the work when the mandrel 18 is in the upper position.

The curved portions of the band 48, between the pressure plates 34 and 36 are shown provided with electrically heated strip plates 86 for heating that portion of the band which overlies and presses against the curved portion of the material being formed.

In the operation of the press the mandrel is lowered to the position shown by the dot and dash lines and a plurality of thin overlapping sheets of material having bonding material therebetween are placed around the top and two sides of the mandrel. The mandrel is then raised by applying a pressure to the piston 24. This operation places the material between the mandrel 18 and band 48 with the work in formed shape, at the upper end of the mandrel stroke. A fluid pressure is then applied to the hose 58 through control valve 84, which by the expansion of the hose, draws the band tightly around the work conforming it to the contour of the mandrel. The heated pressure plates 34 and 36 are then brought into pressure contact with the band 48 further increasing the pressure upon the work. The work remains under pressure and heat during the curing and bonding process.

The press herein illustrated and described provides a means for initially forming the material to the desired shape on a die member and afterward applying a pressure, during heating, to the material while it is preformed and held to its desired shape.

While I have described a form of the invention for illustrative purposes, it will be understood that various changes in the size, shape and arrangement of parts may be made without departing from the spirit of my invention and it is not my intention to limit is scope other than by the terms of the appended claim.

I claim:

A press comprising a frame, movable pressure plates having inwardly presenting contact surfaces carried by said frame, a mandrel having an outer forming surface, means for moving said mandrel between said pressure plates, means for applying pressure between said pressure plates and said mandrel, and locking means mounted on said frame and operatively connected to said mandrel for retaining said mandrel between said pressure plates in pressure engaging relation independent of the pressure applying means.

ROMER G. WEYANT.

REFERENCES CITED

The following references are of record in the file of this patent:

UNITED STATES PATENTS

| Number | Name | Date |
|---|---|---|
| 115,536 | Smith et al. | May 30, 1871 |
| 348,568 | McGowan | Sept. 7, 1886 |
| 596,645 | Woodward et al. | Jan. 4, 1898 |
| 1,021,526 | Huston | Mar. 26, 1912 |
| 1,312,615 | Cooper | Aug. 12, 1919 |
| 2,009,265 | Hirschfield | July 23, 1935 |
| 2,322,962 | Dickson et al. | June 29, 1943 |
| 2,337,250 | Klassen | Dec. 21, 1943 |
| 2,415,504 | MacDonald | Feb. 11, 1947 |

FOREIGN PATENTS

| Number | Country | Date |
|---|---|---|
| 406,005 | Great Britain | Feb. 15, 1934 |